United States Patent Office 3,050,573
Patented Aug. 21, 1962

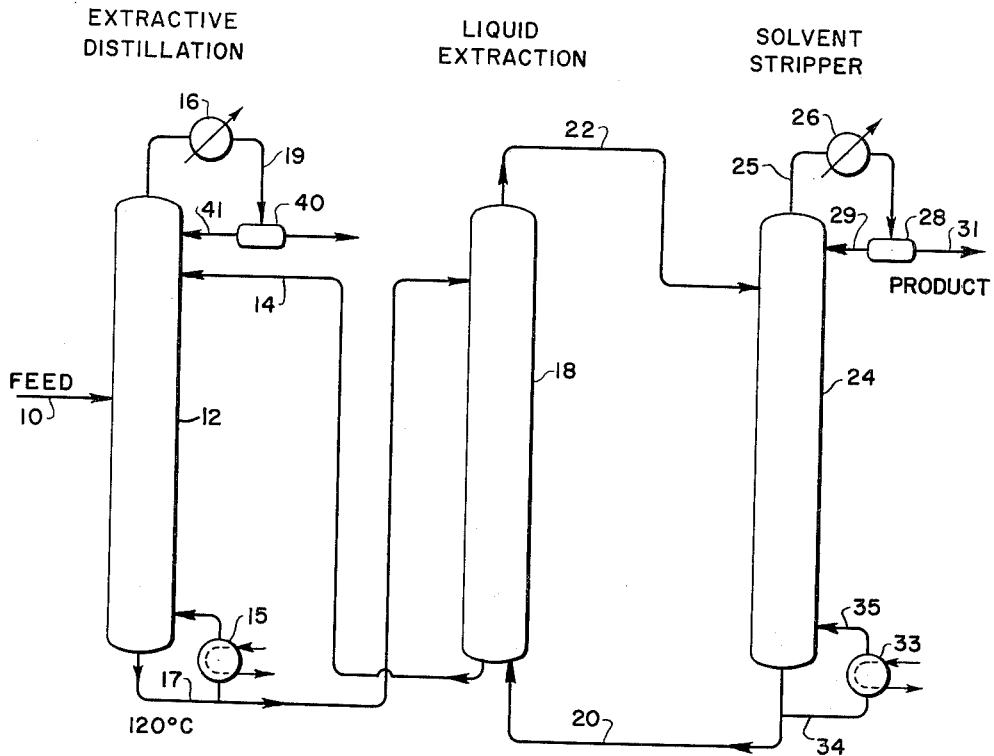

3,050,573
EXTRACTIVE DISTILLATION
Ralph Anderson, Albany, and Carl H. Deal, Jr., Orinda, Calif., assignors to Shell Oil Company, a corporation of Delaware
Filed Dec. 6, 1957, Ser. No. 701,124
2 Claims. (Cl. 260—681.5)

This invention relates to an improved process of extractive distillation for separating a low boiling olefin from a hydrocarbon mixture containing that olefin and close boiling, more saturated materials of the same carbon number.

There are hydrocarbon mixtures of compounds whose normal volatilities are such that separation cannot be readily achieved with ordinary fractional distillation. The problem is most commonly encountered in the separation of mono-olefins from paraffins and diolefins from mono-olefins of the same carbon number. For example, in the manufacture of butadiene, the butanes are separated from the butenes and the butadiene from the butenes. The same difficult separation prevails in isoprene manufacture where it becomes necessary to separate compounds of like carbon numbers and different degrees of saturation.

Generally, the separations are accomplished either by extractive distillation procedures which alter the relative volatilities of the compounds, thus making easier the separations or by processes such as the copper ammonium acetate process where the compound to be separated enters into a loose chemical combination with the extracting solution and in this manner is removed from the close boiling mixture.

Conventionally, isoprene has been separated from its corresponding mono-olefins and paraffins by extractive distillation with low boiling solvents such as aqueous acetone. Acetone and acetonitrile have also been used to separate butenes from butanes. Heretofore, it has been generally considered necessary from a practical standpoint to use low boiling solvents for these separations, even though it was appreciated that certain high boiling, polar solvents were more selective for the unsaturated compound that the commonly-used low boiling solvents. The objections to widespread use of these otherwise desirable high boiling solvents have been three-fold, namely, the excessive high heat load required for solvent stripping of the extract phase, the instability generally exhibited by most of the high boiling organic solvents at or above their boiling point and possible polymerization of the unsaturated extract attributable to the high temperature attending the stripping operation. Solvent decomposition is evidenced by an objectionably large solvent loss and by contamination of the product by volatile decomposition by-products.

It may be said that the temperature of the available plant cooling water has in effect dictated the general use of low boiling solvents in the separation of such low boiling hydrocarbons as isoprene and butadiene. This is because the extract phase containing the separated unsaturated hydrocarbon and solvent from the extractive distillation column must be heated to a relatively high temperature, in excess of the normal boiling temperature of the solvent to provide he elevated pressure, say 25 p.s.i.a. or thereabouts, needed to condense the hydrocarbon stripped from the extract phase with normally available plant cooling water of say 20° C. Many high boiling solvents are unstable at and above their normal boiling points which in itself prevents their use. Additionally, where the solvent is high boiling the heat load needed to effect the solvent stripping at this elevated pressure may well be prohibitive from a cost standpoint. Because of these difficulties inherent in solvent stripping of high boiling solvents, low boiling solvents have been conventionally used in the extractive distillation of various low boiling hydrocarbon mixtures, even though it has been recognized that the particular low boiling solvent utilized often had a selectivity less than that desired.

Various methods have been suggested that would seemingly permit the use of these high boiling and frequently unstable solvents, but on closer examination the various schemes have been found not suitable for one reason or another. The obvious manner of operating the solvent stripper to permit the use of low pressure and temperature involves condensing the overhead vapors with a refrigerated cooling system. This approach is not practical because of economic considerations. Another of such schemes involves the use of a diluent such as benzene which lowers the boiling point of the solvent, permitting the solvent stripper to operate at a more favorable temperature. But unfortunately, the use of such a diluent in the amounts required adversely affects the selectivity of the solvent, often dropping its selectivity to the range or below that of the low boiling solvents, with the result that there is little or no advantage in the use of the high boiling solvent. Another suggestion involves the addition of water to the solvent to lower its boiling point and in this manner forestall decomposition and possible polymerization of the extract and simultaneously reduce the heat load, but the use of too large an amount of water lessens the solubility of the extracted material in the solvent, with the result it becomes necessary to circulate larger quantities of the solvent.

The advantages of the process of the invention will become apparent from the following description of the invention as illustrated in the drawing, which consists of a sole figure which is a schematic representation of a system for the practice of a preferred embodiment of the process.

It has been found that extractive distillation with a high boiling solvent may be achieved with an expenditure of much less energy than has heretofore been considered necessary with substantially no decomposition of the solvent or polymerization of the extract occurring. In the improved process of the invention an unsaturated $C_3$ to $C_6$ hydrocarbon is extractively distilled from a mixture containing that material and a close boiling, more saturated material of a like carbon number with a high boiling, polar solvent selective for the particular unsaturated hydrocarbon. By high boiling is meant a normal boiling temperature in excess of about 160° C. The extract phase from this extractive distillation, containing the high boiling solvent and the unsaturated hydrocarbon is introduced to a liquid-liquid extraction with a non-polar solvent for the unsaturated hydrocarbon to form a second extract phase made up of the second solvent and the unsaturated hydrocarbon. The second solvent has a boiling point significantly lower than the boiling point of the first solvent. The second extract phase is then stripped. The temperature of this stripping operation is appreciably lower than that which would have been required for the stripping of the hydrocarbon from the first solvent. The stripped hydrocarbon of the overhead stream is then condensed with an available plant cooling water.

The process of the invention is especially adapted to the recovery of $C_3$ to and including $C_6$ unsaturated hydrocarbons from a hydrocarbon mixture containing one of these compounds and is corresponding mono-olefin and/or paraffin. A broad spectrum feed stock containing compounds of varying carbon numbers may be used but generally fractional distillation is advantageously employed to provide a narrow cut, say a $C_5$ or $C_4$ cut for the extractive distillation. The process is particularly beneficial for the separation of $C_3$–$C_6$ hydrocarbons as the problems of solvent instability and excess heat load are emphasized in the separation of these materials with a high boiling solvent.

The first solvent is organic and polar in nature. The advantages afforded by the process of the invention are principally realized with solvents having normal boiling temperatures at atmospheric pressure in excess of about 160° C. as it is these materials which must be heated in the conventional approach to the objectionably high temperatures in order to supply the extract at a pressure which permits its condensation with ordinary cooling water. Among the various organic solvents contemplated for use are pyrrolidone, dimethyl sulfoxide, propylene carbonate, ethylene carbonate, and beta,beta'-oxydipropionitrile. Dimethyl sulfoxide is the preferred solvent. These several solvents have satisfactory solvent properties in the range needed for mono-olefin-diolefin and mono-olefin-paraffin separations.

The process of the invention encompasses the use of a diluent, for example, water or an organic material to adjust the selectivity of or the solubility of the solutes in the high boiling solvents. Obviously, the diluent will be judiciously selected and used in an amount not to destroy the advantages accruing to the employment of a high boiling solvent in the process. As an example, it maybe permissible and desirable to add a diluent, say benzene, to a high boiling first solvent having an exceptionally high selectivity and thereby lower the temperature of operation of the extractive distillation tower without unduly jeopardizing the advantages to be had in the use of a high boiling solvent.

The two solvents should be substantially immiscible in each other and the second solvent preferably displaying a more favorable distribution coefficient for the hydrocarbon extract than the first solvent. The second solvent is non-polar and preferably a paraffin. $C_7$-$C_{10}$-paraffins are contemplated for use, with heptane in particular and octane being the preferred materials. The second solvent has a lower boiling point than the first polar solvent and is stable at and above its normal boiling temperature.

The process is adapted to the use of the cooling waters normally available in a petroleum refinery plant. The temperature range of such cooling waters will generally vary from about 15° C. to circa 40° C.

In the example, illustrated in the accompanying flow diagram, dimethyl sulfoxide is utilized as the extractive distillation solvent and n-heptane as the non-polar solvent of the liquid-liquid extraction. Dimethyl sulfoxide has a normal boiling temperature of 187° C. and is usually considered unsuitable as an extractive distillation solvent because of the high heat requirements for stripping its extract. In the process of the example, there is no significant production contamination attributable to decomposition of the dimethyl sulfoxide and very little solvent loss. It will be noted that the high boiling solvent circulates at a relatively low temperature. The n-heptane employed as the second solvent has a normal boiling point of 98.4° C., a temperature considerably below that of the dimethyl-sulfoxide and is stable at the temperature of the operation of the solvent stripper for the liquid-liquid extraction tower. The size of the distillation column needed for stripping the heptane is considerably smaller than would be required for stripping the dimethyl sulfoxide if that high boiling solvent had been used as the sole solvent in the conventional extractive distillation manner.

In the preferred embodiment of the improved process as illustrated in the accompanying drawing a stream 10 of a $C_5$ cut of catalytically cracked gasoline that has been dehydrogenated is introduced as a vapor or as a liquid at just below its boiling point into the lower portion of a conventional extractive distillation tower 12. Dimethyl sulfoxide in a solvent:feed ratio of 4:1 enters the tower adjacent its top at a temperature of approximately 80° C. through a line 14. Heat needed for the operation of the tower is supplied by a reboiler 15 which has as a source of heat, high pressure supersaturated steam. The tower is maintained at a pressure of about 35 p.s.i.a. and a temperature of approximately 130° C. The hydrocarbon stream is volatilized and passes in a gas form countercurrent to the descending liquid solvent which selectively extracts isoprene from the hydrocarbon material to form a solvent extract phase which is removed from the base of the tower via a line 17 and passed to a liquid-liquid extraction tower 18 which may be of conventional design or preferably a rotary disc contactor type. The gas raffinate leaves the top of the extractive distillation unit through a condenser 16 and a line 19. A portion of the condensate collecting in receiver 40 is returned through a line 41 as reflux to the extractive distillation tower 12.

In the liquid-liquid extraction tower the extract phase passes in countercurrent flow to a second solvent, heptane, which is admitted to the tower via a conduit 20. The isoprene preferentially passes into solution in the heptane forming a second extract phase which exits from the tower through a line 22. The raffinate of the liquid-liquid extraction is the dimethyl sulfoxide substantially free of isoprene and is recycled through the aforementioned line 14 to the extractive distillation tower. The solvent:feed ratio to the liquid-liquid extraction tower is about one volume of solvent per a volume of the extract phase feed. This tower has no heat supplied to it and consequently operates at nearly the same temperature as the extractive distillation unit. The second extract phase passes to a solvent stripper 24 which operates at about 120° C. and a pressure of around 35 p.s.i.a. and here the isoprene leaves the heptane in an overhead vapor and passes in a conduit 25 to a condenser 26 which is cooled with plant cooling water of 25° C. The condensed isoprene is collected in a receiver 28 and from there a portion is returned via a line 29 to reflux the stripper and the remainder of the condensed isoprene is removed as product through a line 31. The heat needed to vaporize the isoprene is supplied to the stripper through a reboiler 33 connected to the stripping tower by lines 34 and 35. The isoprene-free heptane is recycled to the liquid-liquid extraction tower through the aforementioned line 20.

We claim as our invention:
1. A process for the extractive distillation of isoprene from a mixture of close boiling, more saturated $C_5$ hydrocarbons comprising extractively distilling the mixture in the presence of dimethyl sulfoxide to obtain a first extract phase containing dimethyl sulfoxide and isoprene, introducing said first extract phase to a liquid-liquid extraction with a $C_7$ to $C_{10}$ paraffin to form a second extract phase containing said paraffin and isoprene, and stripping the second extract phase to separate the isoprene from the paraffin.

2. A process in accordance with claim 1 wherein the non-polar solvent is heptane.

References Cited in the file of this patent

UNITED STATES PATENTS

| | | |
|---|---|---|
| 2,357,028 | Shiras et al. | Aug. 29, 1944 |
| 2,357,344 | Morris et al. | Sept. 5, 1944 |
| 2,360,859 | Evans et al. | Oct. 24, 1944 |
| 2,360,861 | Pierotti et al. | Oct. 24, 1944 |
| 2,361,493 | Patterson | Oct. 31, 1944 |
| 2,426,706 | Patterson | Sept. 2, 1947 |
| 2,434,424 | Morris et al. | Jan. 13, 1948 |
| 2,455,803 | Pierotti | Dec. 7, 1948 |
| 2,508,723 | Mayland et al. | May 23, 1950 |
| 2,523,681 | Cole | Sept. 26, 1950 |
| 2,773,006 | Carver | Dec. 4, 1956 |
| 2,786,085 | Bloch | Mar. 19, 1957 |